March 8, 1960 — F. E. TUCZEK — 2,927,831
SEALING RINGS

Filed Jan. 17, 1957 — 2 Sheets-Sheet 1

INVENTOR.
F. E. Tuczek
BY
ATTYS.

March 8, 1960   F. E. TUCZEK   2,927,831
SEALING RINGS
Filed Jan. 17, 1957   2 Sheets-Sheet 2
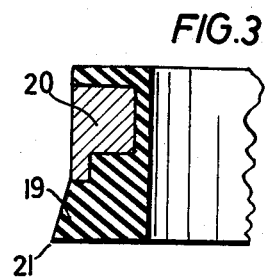
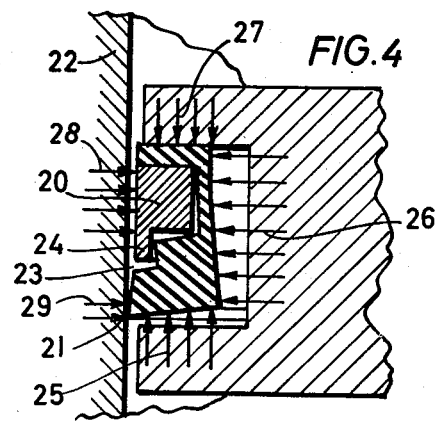
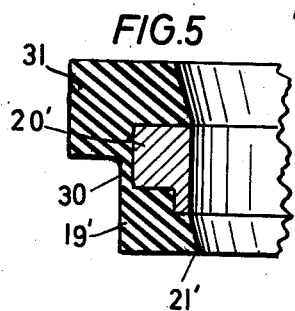
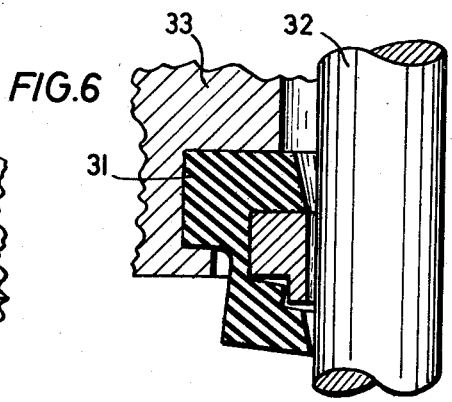
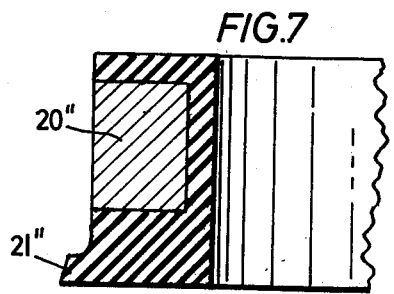
INVENTOR.
F. E. Tuczek
BY
Hascall Downing Seibold
ATTYS.

United States Patent Office 2,927,831
Patented Mar. 8, 1960

2,927,831
SEALING RINGS

Franz Emil Tuczek, Eitorf (Sieg), Germany

Application January 17, 1957, Serial No. 634,632

Claims priority, application Germany January 21, 1956

12 Claims. (Cl. 309—44)

This invention relates to a sealing ring and especially but not exclusively to a closed ring for sealing reciprocating machine parts such as pistons and piston rods or rotating machine parts in which the ring is intended to seal the parts against leakage of liquid or gas of high pressure up to, say, 100 atmospheres or more and which is made of a material of high mechanical strength but so resilient that the ring can be made oversize before installation but under the internal stresses produced does not exert unpermissibly high pressures against the sealed surface or excessive friction. A condition for satisfactory sealing is that the sealing edge of the ring which faces the pressure to be sealed is applied to the surface with a pressure intensity which is greater than that of the pressure itself to be sealed. If a ring with the above stated material properties made of synthetic material is used, the internal stresses are not maintained for a prolonged period because most synthetic materials lose their internal stresses as soon as large forces act continuously.

It is known in piston rings to produce a definite sealing edge with increased pressure of application by making the surface of the ring which is adjacent the cylinder wall slightly conical. In automobile construction such piston rings of grey cast iron are known under the name of Minute rings. In the case of synthetic material the angle can be as much as several degrees. There is, however, the danger that owing to the plastic properties of the material this sealing edge is lost, because the piston ring, after prolonged action of high forces, finally bears wholly against the wall relative to which it moves.

The sealing ring according to the invention is characterised in that on its surface adjacent the wall against which it works it is set back behind a sealing edge and as seen in radial section, in the manner of a beam resting on two supports, bears at one of the places on the sealing edge and at another place on a supporting ring. Between the two places of support, over the surface of the ring away from the wall against which it works, according to the invention a space is provided which communicates with the pressure while the space between the sealing edge and the surface of the supporting ring adjacent the wall is relieved of pressure so that consequent upon the fluid pressures acting upon the ring, the sealing edge is pressed against the wall with a pressure the intensity of which is greater than that of the pressure to be sealed. The further advantage is obtained that the axial sealing surface is pressed with an increased intensity of pressure. This surface can be separately sealed by an interposed sealing disc.

The supporting ring can also be a part of the sealing ring or be enclosed thereby. In this way a sealing ring such as a piston ring is provided which can be inserted in the groove in the manner which is usual for pistons and which has, for example, a rectangular form without a separate supporting ring being necessary. In this way a simplification is obtained as compared with the first described construction, for which special constructional measures are necessary on the piston to form the supporting ring. The combination of the sealing ring with a supporting ring which is enclosed by the sealing ring also makes it possible to use the invention for any other type of sealing element having a sealing lip, in that the sealing ring provides a sealing lip and is connected through a narrow cross-section of the same material with the rest of the sealing element. The connecting cross-section is made so narrow that it does not hinder the bearing of the sealing ring against the wall through its sealing edge and its bearing against the supporting ring.

Some examples of the invention are diagrammatically illustrated in cross-section in the accompanying drawings.

Figure 3 shows a piston ring ready for insertion into a piston groove before actual insertion.

Figure 4 shows the piston ring of Figure 3 after insertion.

Figure 5 shows a sealing ring combined with another body before mounting.

Figure 6 shows the element of Figure 5 after mounting.

Figure 7 shows a piston ring on similar lines to Figure 3 but of simplified form.

Figure 1:
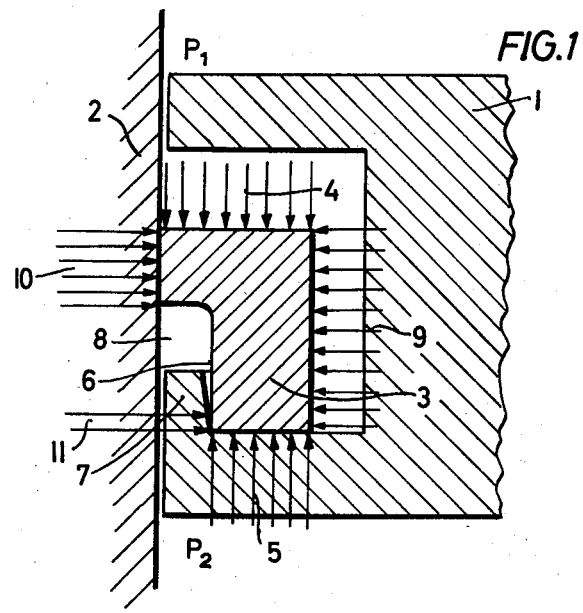
Figure 1 shows a ring for sealing a piston, with the fluid forces also indicated.

The piston 1 (Figures 1 and 2) is sealed to a cylinder 2 by a piston ring 3 which consists, for example, of polyamide. Above the piston reigns a pressure $P_1$ which is greater than that, $P_2$, below the piston. Against the upper end surface of the piston ring acts a uniformly distributed load indicated by the arrows 4 due to the pressure $P_1$. This load in the axial direction is balanced by the bearing pressure indicated by the arrows 5 which is of greater intensity than the pressure 4 because the bearing surface is smaller than the upper end surface of the piston ring. The surface of the piston ring which is adjacent the cylinder wall surface is reduced in diameter below an upper edge portion to the surface 6. The lower end of this surface 6 bears against a supporting ring 7 which is shown integral with the piston, but which could be provided as a separate attached part. Between the upper surface of the supporting ring 7 and the surface 6 of the ring is an intermediate space 8 in which the pressure $P_2$ reigns.

In the radial direction the piston ring is exposed to the pressure $P_1$ indicated by the arrows 9 which is balanced by the pressure indicated by the arrows 10 acting through the sealing edge and by the arrows 11 acting through the supporting ring. As shown, owing to the relative areas, the intensity of pressure 10 is greater than the intensity of pressure 9, equal to $P_1$. The surface of the supporting ring 7 preferably is inclined at a small angle to the wall 6, so that the effective length of the beam constituted by the piston ring as seen in radial section is as great as possible and the intensity of pressure 10 therefore high.

Figure 2:
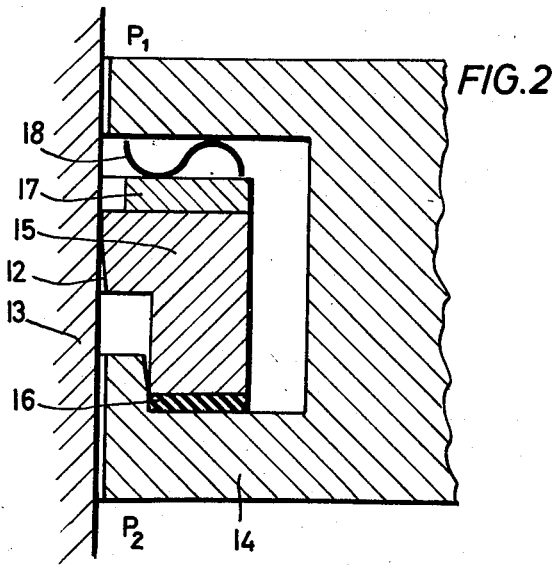
Figure 2 shows another form of ring for sealing a piston rod, provided with an axial sealing disc and a spring disc for producing an axial pre-load.

In the example shown in Figure 2, the effective length of the beam is increased still further in that the peripheral surface 12 of the sealing ring is also slightly inclined to the wall 13. In this way, at the same time the bearing surface at the sealing edge is reduced in area and the pressure intensity increased still further. In Figure 2 the wall 13 is that of a piston rod and the part 14 belongs to the casing or cylinder out of which the piston rod passes. The ring 15 is separately sealed in the axial direction by a sealing disc 16 and is additionally pressed in this direction by a spring ring 18 acting through a disc 17, so that a good seal is ensured, even at low pressures within the casing.

The piston ring 19 shown in Figure 3, made of polyamide or material of similar properties, encloses a supporting ring 20 of steel or other strong material and is made, for example, by a casting process. There is only contact and no adhesion between the adjacent surfaces of the piston ring and the supporting ring. The sealing edge 21 has a greater diameter when free than the cylinder bore 22 and when installed, the piston ring is so deformed that a space 23 is formed behind the sealing edge 21 and the piston ring bears in the manner of a beam on two supports at one place on the sealing edge 21 and at the other on an axial extension 24 of the supporting ring. The loading of the piston ring by the pressure to be sealed in the piston groove is indicated by the arrows 25 and 26. These loadings are balanced by the bearing pressure 27 in the axial direction and in the radial direction by the internal stresses 28 of the supporting ring and the counterpressure 29 at the sealing edge.

In Figure 5, the material of the piston ring 19 is connected through a narrow part 30 with a body 31 of another form, the whole forming a sealing element. When installed, as here shown for example for sealing a piston rod 32, the same conditions arise as in Figure 4, the body 31 of the element being mounted in and sealed to a cylinder cover 33.

Figure 7 shows a simplified construction of piston ring in which the supporting ring 20″ is constructed without an extension and the sealing edge 21″ is kept narrow.

The invention is not restricted to the examples of embodiment illustrated in the drawings. In particular, it is possible to make the supporting ring and sealing ring into a part of preliminary form and to give this a final form by a subsequent machining operation, the hollow space between the sealing edge and the supporting ring, which is necessary in order that the sealing ring may bear at two places, being produced by subsequent operations. It is also possible to make the supporting ring and the piston ring separately and then to assemble them into an element embodying the invention.

The ring can also be given other forms, provided always that the principle of a beam on two supports is given effect. It is not essential that when the parts are assembled the surface 6 (Figure 1) should bear directly against the supporting ring 7, but it suffices if this bearing occurs after elastic or plastic deformation of the sealing ring. The sealing ring can also be used for the sealing of end (flat) surfaces in connection with which the cylinder wall, shown for example in Figure 1, can be regarded as one and the piston surface as the other, of the two relatively moved end surfaces. The ring can be slotted or can be made up of individual segments, the junction surfaces between which can be pressed into sealing engagement by the fluid pressures or by auxiliary means.

What I claim is:

1. A device for sealing a pressure vessel of the type having a movable member therein and forming relatively movable surfaces, comprising a sealing ring having a segment removed to fashion a portion of the outer radial boundary area of reduced diameter, a cavity in the member to receive said sealing ring, a supporting ring surrounded by said sealing ring at the portion of reduced diameter and movable therewith, means forming a volume between the inner radial boundary area of the said sealing ring and the proximate cavity walls intercommunicating with the pressure vessel to provide a pressure differential between the inner and outer radial boundary areas to force the sealing ring outward for pressure engagement against the perssure vessel wall and the supporting ring respectively.

2. A device for sealing a pressure cavity of the type having a movable member therein and forming relatively movable surfaces, comprising a sealing ring having a portion of its outer radial boundary area of reduced diameter carried in a chamber in the member and forming a first volume, a supporting ring surrounded by said sealing ring at the portion of reduced diameter and movable therewith, means forming a second volume between the inner radial boundary area of the said sealing ring and the proximate chamber walls and in communication with the pressure cavity to provide a pressure differential between the inner and outer radial boundary areas whereby to urge the said sealing ring in an outward radial direction to engage in two discrete places against the pressure cavity wall and the supporting ring respectively.

3. The invention as set forth in claim 1, including a sealing disc disposed between the lower axial surface of said sealing ring and the adjacent cavity wall.

4. The invention as set forth in claim 1, wherein the said sealing ring is fashioned of polyamide.

5. The invention as set forth in claim 1, wherein the outer radial boundary area of the said sealing ring forms an acute angle with the pressure vessel wall, said area flaring outwardly in the direction of the portion of reduced diameter.

6. The invention as set forth in claim 3, including a spring ring interposed between the upper axial surface of said sealing ring and the cavity wall and urging in a downward direction.

7. The invention as set forth in claim 1, wherein the said supporting ring includes an axial extension and the said sealing ring when deformed into the cavity engages against the pressure wall and the axial extension.

8. The invention as set forth in claim 7, wherein the said sealing ring is fashioned from polyamide and the supporting ring is fashioned from steel.

9. The invention as set forth in claim 7, wherein a portion at least of the outer radial boundary area forms an acute angle with the vessel wall as seen in section.

10. The invention as set forth in claim 8, wherein the said sealing ring extends radially outward from the ends of the portion of reduced diameter to embrace the said supporting ring.

11. The invention as set forth in claim 2, wherein the inner radial boundary of said supporting ring forms an acute angle with the outer boundary area of said sealing ring whereby the surface engagement between the said supporting ring and sealing ring is at a minimum and the displacement between the said two discrete places is a maximum.

12. The invention as set forth in claim 11, wherein the peripheries of the said rings are continuous.

References Cited in the file of this patent

UNITED STATES PATENTS

| 1,919,183 | Paton | July 18, 1933 |

FOREIGN PATENTS

| 287,694 | Germany | Oct. 1, 1915 |
| 935,942 | Germany | Dec. 1, 1955 |